United States Patent
Marumori

(10) Patent No.: US 9,196,311 B2
(45) Date of Patent: Nov. 24, 2015

(54) VIDEO RECORDING METHOD AND VIDEO RECORDING DEVICE

(71) Applicant: HITACHI MAXELL, LTD., Osaka (JP)

(72) Inventor: Hiroyuki Marumori, Yokohama (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/244,078

(22) Filed: Apr. 3, 2014

(65) Prior Publication Data

US 2014/0212108 A1     Jul. 31, 2014

Related U.S. Application Data

(63) Continuation of application No. 13/476,118, filed on May 21, 2012, now Pat. No. 8,724,962, which is a continuation of application No. 11/688,273, filed on Mar. 20, 2007, now Pat. No. 8,184,957.

(30) Foreign Application Priority Data

Jul. 18, 2006   (JP) ................. 2006-195363

(51) Int. Cl.
  *H04N 5/92*   (2006.01)
  *G11B 27/32*  (2006.01)
  *G11B 27/034* (2006.01)
  (Continued)

(52) U.S. Cl.
  CPC ............ *G11B 27/329* (2013.01); *G11B 27/034* (2013.01); *H04N 5/85* (2013.01); *H04N 5/917* (2013.01); *H04N 9/80* (2013.01); *G11B 2220/2541* (2013.01)

(58) Field of Classification Search
  CPC ..... H04N 9/8042; H04N 5/85; G11B 27/034; G11B 27/105; G11B 2220/2562
  See application file for complete search history.

(56) References Cited

U.S. PATENT DOCUMENTS 7,283,429 B2   10/2007   Suzuki
7,505,674 B2    3/2009   Mikawa
(Continued)

FOREIGN PATENT DOCUMENTS

JP    2001-157145    6/2001
JP    2002-056651    2/2002
(Continued)

OTHER PUBLICATIONS

JP Office Action for Japanese Application No. 2013-019397, issued on Jan. 21, 2014.

*Primary Examiner* — William C Vaughn, Jr.
*Assistant Examiner* — Daniel Tekle
(74) *Attorney, Agent, or Firm* — Mattingly & Malur, PC

(57) ABSTRACT

A video recording device including: a format control section defining a video file record to produce a file via a format defined having a BDMV directory and at least directories to record the video signal and to record Play List data further arranged below the BDMV directory, and forms the format so one Play Item is produced in each of segments of video scenes to be acquired and a plurality of Play Items are arranged within one piece of the Play List data; and a recording control section recording the video information on the recording medium according to the format formed by the format control section, wherein when video acquired by the camera is recorded where a first piece of Play List data is produced, Items are produced within the first piece of the Play List data without generating a new piece of Play List data.

20 Claims, 4 Drawing Sheets

```
Root----BDMV--|
              |----PLAYLIST
              |        |----00000.mpls
              |        |----00001.mpls
              |----CLIPINFO
              |        |----01000.clpi
              |        |----02000.clpi
              |----STREAM
                       |----01000.m2ts
                       |----02000.m2ts
```

(51) Int. Cl.
*H04N 9/80* (2006.01)
*H04N 5/85* (2006.01)
*H04N 5/917* (2006.01)

(56) References Cited

U.S. PATENT DOCUMENTS

| | | |
|---|---|---|
| 7,525,881 B2 | 4/2009 | Suzuki |
| 7,724,289 B2 | 5/2010 | Kudo |
| 2002/0135608 A1 | 9/2002 | Hamada et al. |
| 2002/0197058 A1 | 12/2002 | Suzuki et al. |
| 2003/0152369 A1 | 8/2003 | Isobe et al. |
| 2005/0141879 A1 | 6/2005 | Chung et al. |
| 2005/0201718 A1 | 9/2005 | Kato |
| 2006/0013564 A1 | 1/2006 | Hamada et al. |
| 2006/0184542 A1 | 8/2006 | Kim et al. |
| 2006/0294132 A1 | 12/2006 | Hsieh et al. |
| 2008/0008056 A1* | 1/2008 | Suzuki .................. 369/30.09 |
| 2008/0063369 A1* | 3/2008 | Kim et al. ................. 386/95 |
| 2009/0142037 A1 | 6/2009 | Mikawa |
| 2009/0317067 A1 | 12/2009 | Isobe et al. |
| 2010/0129066 A1 | 5/2010 | Maeda et al. |
| 2010/0215345 A1 | 8/2010 | Matsuno et al. |

FOREIGN PATENT DOCUMENTS

| | | |
|---|---|---|
| JP | 2002-354425 | 12/2002 |
| JP | 2003-308675 | 10/2003 |
| JP | 2004-173202 | 6/2004 |
| JP | 2004-187066 | 7/2004 |
| JP | 2004-336566 | 11/2004 |
| JP | 2005-27159 | 1/2005 |
| JP | 2005-333557 | 12/2005 |
| JP | 2006-067065 | 3/2006 |
| JP | 2007-305171 | 11/2007 |
| JP | 2007-305213 | 11/2007 |

\* cited by examiner

FIG.2

```
Root----BDMV--|
              |----PLAYLIST
              |        |----00000. mpls
              |        |----00001. mpls
              |----CLIPINFO
              |        |----01000. clpi
              |        |----02000. clpi
              |----STREAM
                       |----01000. m2ts
                       |----02000. m2ts
```

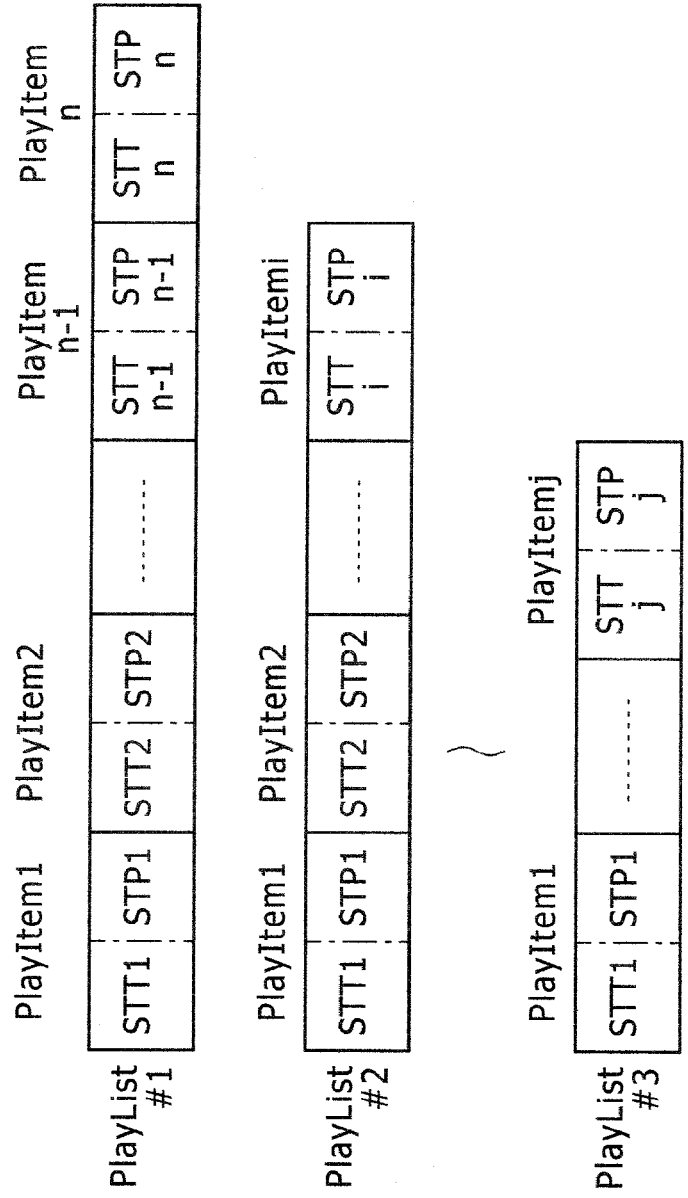

VIDEO RECORDING METHOD AND VIDEO RECORDING DEVICE

CROSS REFERENCE TO RELATED APPLICATION

This is a continuation of U.S. application Ser. No. 13/476,118, filed May 21, 2012, which is a continuation of U.S. application Ser. No. 11/688,273, filed Mar. 20, 2007 (now U.S. Pat. No. 8,184,957). This application relates to and claims priority from Japanese Patent Application No. 2006-195363, filed on Jul. 18, 2006. The entirety of the contents and subject matter of all of the above is incorporated herein by reference.

BACKGROUND OF THE INVENTION

1. Field of the Invention

The present invention relates to a video recording method and a video recording device, and in more detail to a technique for recording a video including a moving picture or a still picture on a recording medium such as an optical disc. More particularly, the present invention relates to a method and device for recording and playing back a file on a recording medium according to the management of a recording film and a format that is managed in a given format in a camera that records a video on an AVCHD (advanced video codec high definition) or a BD (blu-ray disc), and a recording medium based on a specific format.

2. Description of the Related Art

The AVCHD/BD camera records taken video image on a recording medium as a file in the format of application based on BD-RE Ver3.0 standard. The standard is the subset of the BDMV format (hereinafter referred to as "BDMV-s") based on the BD-ROM standard, and a defined format at the time of self encoding in a recorder or a camera, and manages one recoding unit with a Play List.

In recording information on the recording medium, video information is compressed according to a given compression system and then recorded on the recording medium. As the compression system, an MPEG (moving picture expert group) standard is generally used for recording the moving picture. Also, a JPEG (joint photographic experts group) standard used for still picture digital recording in a general electronic still camera is employed for recording the still image.

For example, in the case of a DVD recorder, the video that is recorded on the recording medium is managed in a unit that is called "video title set" as disclosed in JP 2003-308675A. In one recording operation, the number of title (TT) is 99 at maximum. On the other hand, in the case of the DVD camera, TT is constructed by PTT (chapter), and one recording unit is 256 in the number of PTT. When the number of TT exceeds the maximum number of 99, TT is increased.

SUMMARY OF THE INVENTION

In general, the recorder suffers from no problem since the number of recordings is not so large. On the other hand, the camera is different from the recorder, and frequently takes a large number of short scenes. In the BD camera, an mpls file, a clpi file, and an m2ts file are added to management information as one set and stored every time the video is recorded once. That is, the number of files is increased every time the video is recorded. On the other hand, when the BD camera starts, it is necessary to read the mpls file in a memory. For that reason, when the number of recorded videos is increased, a period of time required for the file reading is prolonged, and a starting time is also prolonged, which is a problem. Accordingly, in order to shorten the starting time, it is preferable to reduce the number of video files as large as possible.

The present invention has been made to solve the above problems, and therefore an object of the present invention is to suppress an increase in the number of files to be managed as much as possible even if the number of video recording is increased.

Another object of the present invention is to provide a video recording device, a video recording method, and a recording medium, which do not prolong a reading time of the video file so much even if the number of video scenes to be recorded is increased.

In the video recording method according to the present invention, preferably in a video recording method that records a video on the recording medium in a given file format, a file in which an interval of video data is recorded according to the given file format is produced, saved in a memory, and managed, and the file is not updated every time video is recorded, and the video is recorded on the recording medium in each of predetermined specific recording units.

In a preferable example, plural Play Items are arranged in Play List data in which an interval between a start and an end of the video data to be played back is recorded, the Play List is not updated every time the video scene is recorded, and the Play Item is produced and added as the specific recording unit.

Also, according to the present invention, in the video recording method that records the video on the recording medium in the file format, a file is produced according to the format based on the BDMV-s standard that is so defined as to arrange a BDMV directory below a Root directory, and to arrange the respective directories of PLAYLIST, CLIPINFO, and STREAM below the BDMV directory, and is recorded on the recording medium, the format is so formed so to produce one Play Item in each of segments of acquired video scenes, and to arrange the plural Play Items in one Play List data, and the video is recorded on the recording medium according to the format.

It is preferable that the Play Item is increased and produced one by one without updating the Play List data every time one scene video is recorded on the recording medium.

Also, it is preferable that the Play List data is newly produced and updated every time date is updated.

Further, it is preferable that the mpls file, the clpi file, and the m2ts file are managed as one set in one video record, the mpls file is associated with the Play Item, and information for managing start and end locations where the video is recorded is stored in the Play Item.

Still further, it is preferable that the format is so formed as to hold 2000 pieces of Play List data at maximum and 999 pieces of Play Items at maximum.

The image recording device according to the present invention, preferably, the video recording device that records the video on the recording medium in a file format, includes a signal processing section that processes an acquired video signal to output a video signal; a video compression section that encodes the video signal that is output from the signal processing section in a given encoding system to output video information; a format control section that defines video file record so as to produce a file according to a format based on a BDMV-s standard which is so defined as to arrange a BDMV directory below a Root directory, and to arrange the respective directories of PLAYLIST, CLIPINFO, and STREAM below the BDMV directory to record the file on the recording medium, and forms the format so as to produce one Play Item in each of segments of the acquired video scenes and to arrange a plurality of Play Items in one piece of Play List data; and a recording control section that records the video information on the recording medium according to the format that is formed by the format control section.

Further, in a recording medium according to the present invention, preferably in a recording medium on which a video that has been subjected to predetermined signal processing is recorded in a file format, a file is produced according to the format based on the BDMV-s standard that is so defined as to arrange a BDMV directory below a Root directory, and to arrange the respective directories of PLAYLIST, CLIPINFO, and STREAM below the BDMV directory, and is recorded on the recording medium, the format is so formed so to produce one Play Item in each of segments of acquired video scenes, and to arrange the plural Play Items in one Play List data, and the video is recorded on the recording medium according to the format.

According to the present invention, an increase in the number of files to be managed can be suppressed as much as possible even if the number of video recording is increased. For that reason, even if the number of video scenes to be recorded by the BD camera is increased, a starting time for reading the video file is not prolonged so much.

BRIEF DESCRIPTION OF THE DRAWINGS

Embodiments of the present invention will be described in detail based on the following figures, wherein:

FIG. 2 is a diagram showing the data structure of a subset of a BDMV format (BDMV-s);

FIG. 3 is a diagram showing the structural example of a Play List; and

DETAILED DESCRIPTION OF THE PREFERRED EMBODIMENTS

Now, a description will be given in more detail of preferred embodiments of the present invention with reference to the accompanying drawings.

Figure 1:
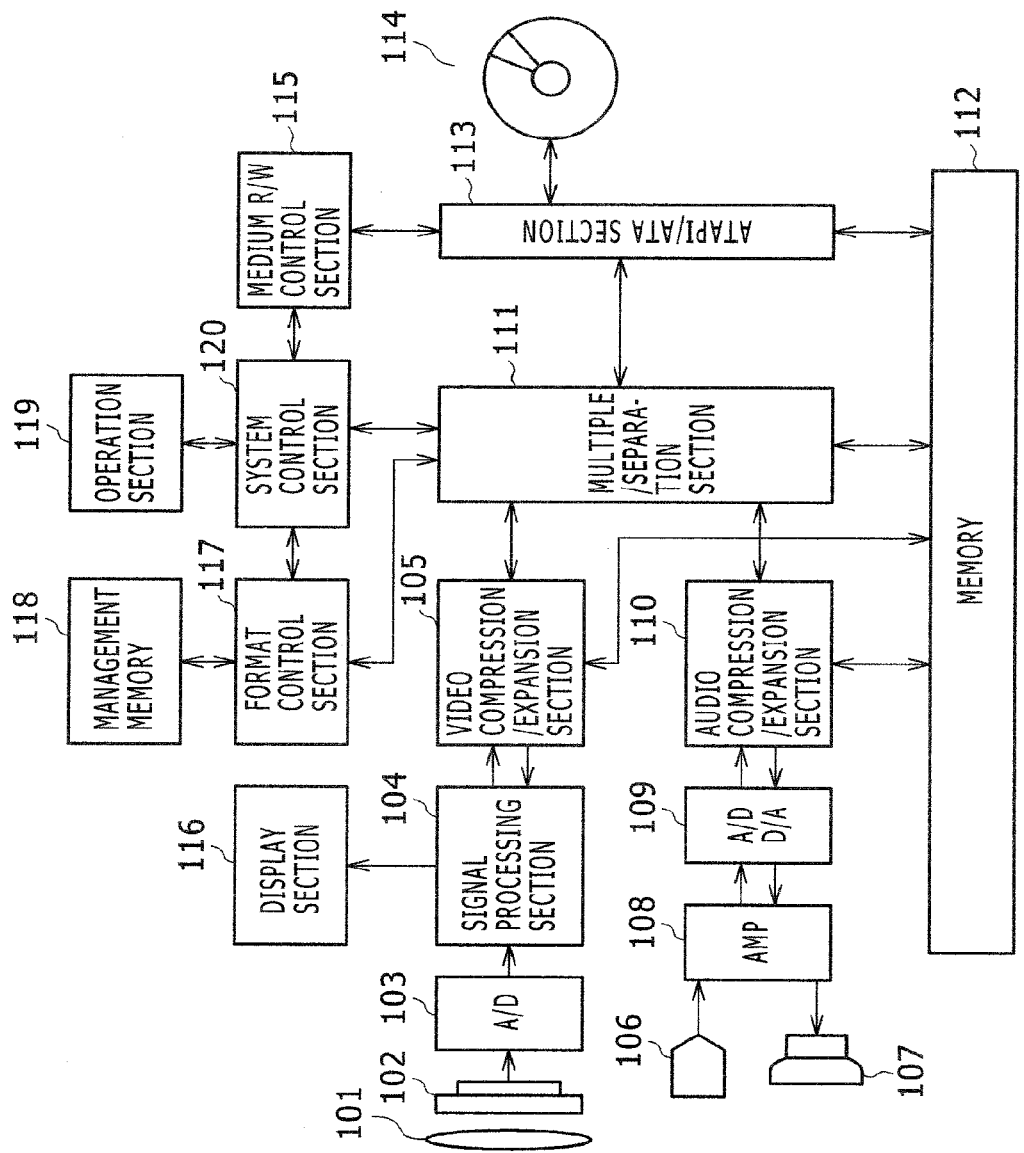
FIG. 1 is a block diagram showing the configuration of a recording device according to an embodiment of the present invention.

FIG. 1 is a block diagram showing a camera integrated recording device. Referring to FIG. 1, reference numeral 101 denotes an optical lens for imaging an object, 102 is a CCD sensor that is photoelectric conversion means for converting an imaged light into an electric signal, 103 is an A/D converter that converts the video electric signal into a digital signal, 104 is a signal processing section that conducts processing for converting the video information that has been converted into the digital signal into a video signal, and 105 is a video compression/expansion section that compresses and expands the video signal according to a given encoding system such as MPEG. Also, reference numeral 106 denotes a microphone that converts a collected sound into an electric audio signal, 107 is a speaker that generates a sound, 108 is an amplifier that amplifies the audio signal, 109 is an A/D converter (D/A converter) that converts the audio electric signal into a digital signal, and 110 is an audio compression/expansion section that compresses and expands the digital audio according to a given encoding system such as JPEG. Reference numeral 111 denotes a multiplex section that multiplexes a moving picture compression stream that has been generated by the video compression/expansion section 105 and an audio compression stream that has been generated by the audio compression/expansion section 110, and 112 is a large-capacity memory that temporarily stores video data that has been compressed by the video compression/expansion section 105, audio data that has been compressed by the audio compression/expansion section 110, and data resulting from multiplexing the video data and the audio data. Also, an ATAPI/ATA section 113 is an interface section that complies with a specific standard, and 114 is a recording medium such as an optical disc. A medium R/W control section 115 conducts control for recording and playing back data file of a moving video and a still video to be recorded and played back with respect to the recording medium 114 in a given file format.

Reference numeral 116 denotes a display section that displays the video. The display section 116 can be separated into a display section within a finder, and a movable display section that is disposed outside of a casing of a video camera. Reference numeral 117 denotes a format control section that identifies the type of the recording medium to generate the information on the format that complies with the BDMV-s standard, and 118 is a management memory that stores the recording format of the data file which is recorded on the recording medium and management information for recording and playback. Reference numeral 119 denotes an operating section that is operated by a user, which includes a record/stop key, a zoom key, a select key of a record mode. Reference numeral 120 denotes a system control section that controls the respective sections of the multiplex/separation section 111, the format control section 117, and the medium R/W control section 115. The system control section 120 has a clock mechanism that times year, month, date, hour, and minute (hereinafter, simply called "date and time"). The date and time that are timed by a clock mechanism are recorded on the stream at the time of multiplexing, and also recorded on the recording medium 114.

In this example, the respective functions of the video compression/expansion section 105, the audio compression/expansion section 110, the multiplex/separation section 111, the format control section 117, and the system control section 120 are preferably realized by executing programs by the aid of a microprocessor. However, a part or all of those programs can be configured by hardware. Also, in FIG. 1, control lines and information lines which are necessary for description are shown, and all of the control lines and the information lines in a product are not always shown. In fact, all of the structural units are substantially connected to each other.

Subsequently, the moving picture recording operation will be described. In the case where the moving picture shooting mode is selected by the operation of the operating section 119, the system control section 120 recognizes the selection, and controls the overall system as follows. The CCD sensor 102 is driven to a moving picture signal generating mode by a drive section (not shown). The image formed by the optical lens 101 is converted into the electric signal by the CCD sensor 102, and then converted into the digital signal by the A/D converter 103. Thereafter, the image is converted into the video data by the signal processing section 104, and temporarily stored in the memory 112. Thereafter, the video data is compressed by the video compression/expansion section 105, and in the compressing process, the video data is sequentially converted into the moving picture compression stream while the video data that is being compressed is transferred between the memory 112 and the video compression/expansion section 105. On the other hand, the sound that has been collected by the microphone 110 is compressed by the audio compression/expansion section 110, and then temporarily stored in the memory 112, likewise. Thereafter, the moving picture compression stream that has been generated by the video compression/expansion section 105 and the audio compression stream that has been generated by the audio compression/expansion section 110, which are stored in the memory 112, are multiplexed by the multiplex/separation section 111, and the multiplexed data is temporarily stored in the memory 112. Finally, the multiplexed data is output from the memory 112, and then recorded on the recording medium 114 in the given recording format through the medium R/W control section 115 and the ATAPI/ATA section 113. The recording format is characterized by this embodiment, and the format control section 117 manages the recording format by a predetermined format, and the shot video is recorded on the recording medium every video scene, as will be described later with reference to FIGS. 2 and 3.

Subsequently the moving picture playback operation will be described. The video is recorded on the recording medium 114 in the file format shown in FIGS. 2 and 3. When the playback of the moving picture that has been recorded on the recording medium 114 is selected, the overall system is controlled by means of the system control section 120 as follows, and the video in each of scenes is read from the recording medium, and played back in a system managed by the format control section 117. That is, the medium R/W control section 115 plays back the moving picture file, and the multiplex/separation section 111 separates the moving picture file into a moving picture compression stream and an audio compression stream, and transmits the moving picture compression stream to the video compression/expansion section 105. The video compression/expansion section 105 sequentially converts the moving picture compression stream into the video signals while transferring the video data that is being expanded with respect to the memory 112. The video compression/expansion section 105 then outputs the video signals to the display section 116 through the signal processing section 104. The audio compression/expansion section 110 expands the audio compression stream, and outputs the expanded stream from the speaker 107.

FIG. 2 is a diagram showing the data structure of a subset (BDMV-s) of a BDMV format. The BDMV format is a format of the application defined by standard BD-RE Ver3.0 which is based on BD-ROM standard. As the format assuming record at the time of self encode of a record or camera, one record unit is managed by Play List. That is, a BDMV directory is arranged below a Root directory, and the respective directories of PLAYLIST, CLIPINFO, and STREAM are arranged below the BDMV directory. The respective directories of PLAYLIST, CLIPINFO, and STREAM are recorded as a set by each record. For example, a file of 00000.mpls, a file of 01000.clpi, and a file of 01000.m2ts are recorded by a first record. A file of 00001.mpls, a file of 02000.clpi, and a file of 02000.m2ts are recorded by a second record. In this way, the files are sequentially increased every record. In the general products of the digital camera, the maximum value of the scene is set to 1000. For that reason, it is desirable that the upper limit of the number of sets of the above file is about 1000. A reading of mpls, clpi, m2ts can be also called a file of mpls.

FIG. 3 is a diagram showing the structural example of Play List. As one of the features of this embodiment, plural Play Items are defined and managed in one Play List. The Play Item manages the information on the mpls film that manages the locations of the start and end of the video to be recorded, and the management information corresponds to the video of one scene. That is, every time the video of one scene is recorded on the recording medium, the management information on the start and the end corresponding to the scene is generated as the information of Play Item, and added to the management information that has been produced up before. The start and end locations can be so designed as to manage an address on the optical disc at which the video is recorded. Alternatively, the date and time information that is timed by the clock mechanism can be stored as a time stamp.

Also, one Play List is newly produced and added as the management information, for example, every time the date is changed. The date information quotes the date and time information that is timed by the clock mechanism of the system control section 120. That is, the Play Item is added to the newly produced Play List every time one scene of the video which has been shot on the same date is increased. Then, the Play Item corresponding to the mpls file, the clpi file, and the m2ts file are produced as one set and managed in each of the video scene records. The management file shown in FIG. 2 and the management information shown in FIG. 3 are produced by the format control section 117 every time the video is recorded, and then stored in the management memory 118, and managed. Also, the management information that has been stored in the memory 118 is referred to when the video is played back.

A description will be given in more detail with reference to FIG. 3. The n Play Items are stored in a Play List #1. That is, the videos of n scenes are stored on the recording medium within one day, and the respective locations of the starts and ends are managed. Likewise, a Play List #2 is newly produced on the next day, and i Play Items are produced and managed on that day. Also, a Play List #m is produced on an m-th day, and j Play Items are managed.

Figure 4A:
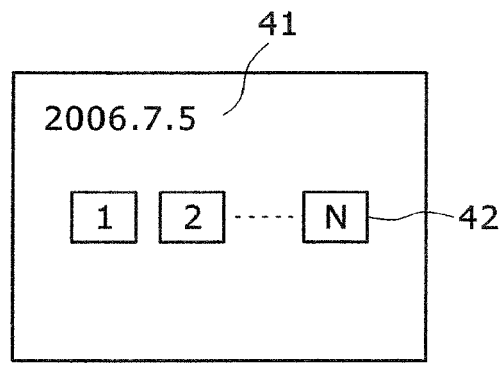
FIGS. 4A to 4C are diagrams showing an example of a display screen indicative of management information of a camera.
Figure 4B:
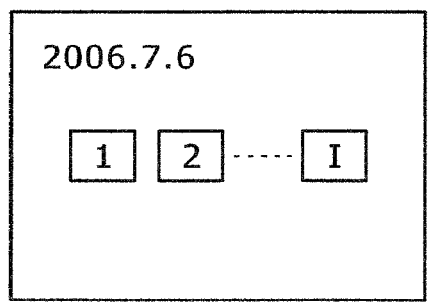
Figure 4C:
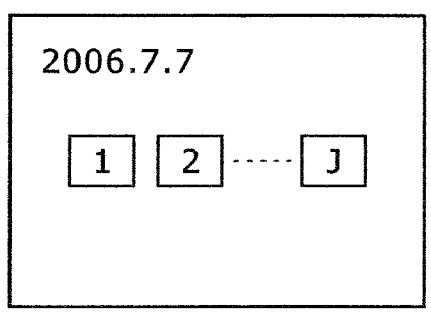

According to this embodiment, the plural Play Items are defined and managed in one Play List. For that reason, means for designating the video in each of the scenes is required. Under the circumstances, as shown in FIG. 4, a screen that displays No. 42 indicative of the number of scenes in each of the dates 41 is produced and displayed on the display section 112. In examples shown in FIG. 4A to FIG. 4C, when a camera is first started after the date changes, Play Lists #1 to #m are produced in correspondence with FIG. 3, respectively, and the Play Items that have been added to the respective Play Lists are managed by No. 42 of the scene. An operator operates the operating section 119, and displays the management screen on the display section 112. As a result, the operator is capable of recognizing the updated Play List and the updated number of Play Items. Also, when the video is played back, the operator operates the operating section 119, reads the management information indicative of the Play List and the Play Items from the management memory 118, and displays the management information on the display section 112. Then, the operator designates the Play List and No. of the Play Item in the Play List to read the video file of the intended scene from the recording medium 114 so as to display the video film on the display section 112. In the case of the BD camera in this embodiment, it is preferable that the format is formed so as to hold 2000 Play Lists at maximum and 999 Play Items at maximum per one Play List, taking the circumstances into account.

According to this embodiment, even if the number of video records is increased, the number of Play Items is increased in correspondence with the number of scene record, and it is unnecessary to increase the number of Play Lists without reason. For that reason, an increase in the number of files to be managed can be suppressed as much as possible, and even if the number of scenes of the video to be recorded by the BD camera is increased, the starting time for reading the video file is not too long.

The present invention is not limited to the above embodiment, and can be implemented with various deformations and application. For example, according to the above embodiment, since the Play List is produced one by one and added every time the date is changed, the correspondence of the dates and the Play Lists are readily taken, and readily managed. However, in the modified example, the Play List can be produced not every time the date is changed, but every two days or plural n days. With this arrangement, since the increase in the files of the Play Lists is further suppressed, the video that complies with the BDMV-s can be effectively recorded.

Also, other modified examples will be described below. In the above embodiment, the Play Items within the Play List data in xxx.rpls is set as a unit of the scene record. On the contrary, in another modified example, Mark_Entry within Play list Mark data in xxx.rpls can be produced in each of the scenes. The Mark_Entry may be used for managing the chapter of a movie in the BD-ROM.

The data structural example of the Play list Mark is described below.

Play list Mark
length
number of Play List_marks (Play List_marks=the number of scenes is counted up (0 to 999))
Mark_entry (information with which the position of the scene video can be discriminated, and Mark_entry corresponding to the number of scenes is produced)
reserved_for_future_use (future reserved area, one byte)
mark_type (type of entry mark or link mark)
ref_to_Play Item_id (indicative of ID of the corresponding Play Item)
mark_time_stamp (information with which the mark position is understood)
entry_ES_PID (indicative of the management information of the corresponding elementary stream)
duration (a duration from mark_time_stamp, normally 0).

In the case where the Mark_Entry is set as a scene record unit, the Play List can be produced every date as in the above embodiment, or the Play Item can be produced every date.

What is claimed is:

1. A video recording device that records a video on a recording medium in a file format, comprising:
   an imaging unit configured to image an object;
   a signal processing unit configured to process output from the imaging unit;
   a video encoding unit configured to encode output from the signal processing unit in a predetermined encoding method to output a video;
   a format control unit configured to control recording format so as to generate and record a file according to a format defined such that a BDMV directory is placed and both of a directory to record the video and a directory to record a PlayList file are placed below the BDMV directory, and form the format such that one PlayItem is generated in each video recording and a plurality of PlayItems are stored in one PlayList file; and
   a recording control unit configured to record the video on the recording medium according to the recording format,
   wherein when a video based on output from the imaging unit is recorded in the state where a first PlayList file is recorded, the PlayItems associated with the video are stored in the first PlayList file without generating a new PlayList file as long as the number of PlayItems stored in the first PlayList file does not exceed a predetermined number.

2. The video recording device according to claim 1, wherein the first PlayList file has information on a date and a time of respective PlayItems stored in the first PlayList file.

3. The video recording device according to claim 1, further comprising:
   a display,
   wherein the display is configured to display a selection screen sorted by date for selecting and reproducing a video on the recording medium, the selection screen sorted by date being generated based on information on a date and a time of the respective PlayItems associated with videos on the recording medium.

4. A video recording device that records a video on a recording medium in a file format, comprising:
   an imaging unit configured to image an object;
   a signal processing unit configured to process output from the imaging unit;
   a video encoding unit configured to encode output from the signal processing unit in a predetermined encoding method to output a video;
   a format control unit configured to control recording format so as to generate and record a file according to a format defined such that a BDMV directory is placed and both of a directory to record the video and a directory to record a PlayList file are placed below the BDMV directory, and form the format such that one PlayItem is generated in each video recording and a plurality of PlayItems are stored in one PlayList file; and
   a recording control unit configured to record the video on the recording medium according to the recording format,
   wherein in case that a video based on output from the imaging unit is recorded on a first date when a first PlayList file is generated, a PlayItem associated with the recorded video is stored in the first PlayList file without generating a new PlayList file as long as the number of PlayItems stored in the first PlayList file does not exceed a predetermined number.

5. The video recording device according to claim 4, wherein when a video based on output from the imaging unit is further recorded on a second date different from the first date, a PlayItem associated with the further recorded video is stored in the first PlayList file without generating a new PlayList file as long as the number of PlayItems stored in the first PlayList file does not exceed the predetermined number.

6. The video recording device according to claim 5, wherein the first PlayList file has information on a date and a time of respective PlayItems stored in the first PlayList file.

7. The video recording device according to claim 4, further comprising:
   a display,
   wherein the display is configured to display a selection screen sorted by date for selecting and reproducing a video on the recording medium, the selection screen sorted by date being generated based on information on a date and a time of the respective PlayItems associated with videos on the recording medium.

8. A video recording device that records a video on a recording medium in a file format, comprising:
   an imaging unit configured to image an object;
   a signal processing unit configured to process output from the imaging unit;
   a video encoding unit configured to encode output from the signal processing unit in a predetermined encoding method to output a video;
   a format control unit configured to control recording format so as to generate and record a file according to a format defined such that a BDMV directory is placed and both of a directory to record the video and a directory to record a PlayList file are placed below the BDMV directory, and form the format such that one PlayItem is generated in each video recording and a plurality of PlayItems are stored in one PlayList file; and a recording control unit configured to record the video on the recording medium according to the recording format, wherein a first PlayItem associated with a video recorded on a first date and a second PlayItem associated with a video recorded on a second date different from the first date are stored in one PlayList file as long as the number of PlayItems stored in the one PlayList does not exceed a predetermined number.

9. The video recording device according to claim 8, wherein the first PlayList file has information on the first date and time corresponding to the first PlayItem and information on the second date and time corresponding to the second PlayItem.

10. The video recording device according to claim 8, further comprising:

a display, wherein the display is configured to display a selection screen sorted by date for selecting and reproducing a video on the recording medium, the selection screen sorted by date being generated based on information on a date and a time of the respective PlayItems associated with videos on the recording medium.

11. A recording apparatus that performs recording a video on a recording medium in a file format, comprising:

an imaging unit configured to image an object;

a format controller configured to control recording format so as to generate and record a file according to a format defined such that a BDMV directory is placed and both of a directory to record a video and a directory to record a PlayList file are placed below the BDMV directory, and form the format such that one PlayItem is generated whenever each video is recorded and a plurality of PlayItems are stored in one PlayList file; and a recording controller configured to record the video on the recording medium according to the recording format, wherein, when the imaging unit images an object and a video based on output from the imaging unit is recorded on the recording medium in a situation that a first PlayList file is recorded, the PlayItem associated with the video is stored in the first PlayList file without generating a new PlayList file as long as the number of the PlayItems in the first PlayList file does not exceed a predetermined number.

12. The recording apparatus according to claim 11, wherein the first PlayList file has information on a date and a time of respective PlayItems stored in the first PlayList file.

13. The recording apparatus according to claim 11, further comprising:

a display, wherein the display is configured to display a selection screen sorted by date for selecting and reproducing a video on the recording medium, the selection screen sorted by date being generated based on information on a date and a time of the respective PlayItems associated with videos on the recording medium.

14. A recording apparatus that performs recording a video on a recording medium in a file format, comprising:

an imaging unit configured to image an object;

a signal processor configured to process output from the imaging unit;

a video encoder configured to encode output from the signal processor unit in a predetermined encoding method to output a video;

a format controller configured to control recording format so as to generate and record a file according to a format defined such that a BDMV directory is placed and both of a directory to record a video and a directory to record a PlayList file are placed below the BDMV directory, and form the format such that one PlayItem is generated whenever each video is recorded and a plurality of PlayItems are stored in one PlayList file; and a recording controller configured to record the video on the recording medium according to the recording format, wherein, in case that a video based on output from the imaging unit is recorded on a first date when a first PlayList file is generated, a PlayItem associated with the recorded video is stored in the first PlayList file without generating a new PlayList file as long as the number of PlayItems stored in the first PlayList file does not exceed a predetermined number.

15. The recording apparatus according to claim 14, wherein when a video based on output from the imaging unit is further recorded on a second date different from the first date a PlayItem associated with the further recorded video is stored in the first PlayList file without generating a new PlayList file as long as the number of PlayItems stored in the first PlayList file does not exceed the predetermined number.

16. The recording apparatus according to claim 15, wherein the first PlayList file has information on a date and a time of respective PlayItems stored in the first PlayList file.

17. The recording apparatus according to claim 14, further comprising:

a display, wherein the display is configured to display a selection screen sorted by date for selecting and reproducing a video on the recording medium, the selection screen sorted by date being generated based on information on a date and a time of the respective PlayItems associated with videos on the recording medium.

18. A recording apparatus that performs recording a video on a recording medium in a file format, comprising:

an imaging unit configured to image an object;

a signal processor configured to process output from the imaging unit;

a video encoder configured to encode output from the signal processor in a predetermined encoding method to output a video;

a format controller configured to control recording format so as to generate and record a file according to a format defined such that a BDMV directory is placed and both of a directory to record a video and a directory to record a PlayList file are placed below the BDMV directory, and form the format such that one PlayItem is generated whenever each video is recorded and a plurality of PlayItems are stored in one PlayList file; and a recording controller configured to record the video on the recording medium according to the recording format, wherein a first PlayItem associated with a video recorded on a first date and a second PlayItem associated with a video recorded on a second date different from the first date are stored in one PlayList file as long as the number of PlayItems stored in the one PlayList does not exceed a predetermined number.

19. The recording apparatus according to claim 18, wherein the first PlayList file has information on the first date and time corresponding to the first PlayItem and information on the second date and time corresponding to the second PlayItem.

20. The recording apparatus according to claim 18, further comprising:
   a display,
   wherein the display is configured to display a selection screen sorted by date for selecting and reproducing a video on the recording medium, the selection screen sorted by date being generated based on information on a date and a time of the respective PlayItems associated with videos on the recording medium.

\* \* \* \* \*